July 17, 1934.  A. W. BULL  1,966,580

METHOD FOR MOUNTING TIRES

Filed Dec. 23, 1932

INVENTOR.
ARTHUR W. BULL
BY
ATTORNEYS.

Patented July 17, 1934

1,966,580

UNITED STATES PATENT OFFICE 1,966,580

METHOD FOR MOUNTING TIRES

Arthur W. Bull, Grosse Pointe Village, Mich., assignor to United States Tire Company, Incorporated, Detroit, Mich., a corporation of Indiana Application December 23, 1932, Serial No. 648,542

4 Claims. (Cl. 157—6)

My invention relates to a method for mounting tires, and more particularly to a method for producing an initial seal between a rim and a tire of the tubeless type wherein sealing elements interpose the tire beads and the rim.

Heretofore it has been customary to utilize an inner tube within most tires for vehicles, and particularly in automobile tires. One reason for this practice is that rims for automobile tires have frequently been provided with a seam, either circumferential or transverse, to facilitate the mounting and dismounting of the tire. Such a seam prevents the rim from being air tight. However, with the advent of the continuous drop center rim and the elimination of separable rims a considerable proportion of automobile wheels are provided with a continuous air tight rim.

In the co-pending application of McNeill and Eger, Serial No. 647,730, filed Dec. 17, 1932, there is shown and described tires which are adapted to co-operate directly with such rims, and provide a fluid tight seal without the use of inner tubes. The present invention particularly relates to methods for perfecting an initial seal between such tires and rims, which seal becomes effective before the internal fluid pressure within the tire is sufficient to insure the functioning of the seals between the rim and tire beads.

I provide apparatus which compresses the tire, after it has been roughly seated in the rim, so as to spread the sidewalls and bead portions of the tire laterally to engage the rim flanges with some force, thereby completing the seals. After the seals are mechanically completed, compressed fluid is admitted to the tire through the usual valve construction. As soon as sufficient pressure has been built up within the tire to insure the retention of the seals, the external pressure is released from the tire and thereafter the seal is maintained by the fluid pressure within the tire.

The fluid pressure at the outer circumference of the tire as it is inflated will produce a total force reacting against any external mechanical appliance of a high order of magnitude. For example, a total force of sixteen hundred pounds may be encountered with a tire of the size of 5.25-18 inflated to a pressure of thirty-six pounds per square inch.

The apparatus for mounting such a tire preferably comprises a band engaging the tread portion of the tire throughout substantially its circumference, and means for drawing the ends of the band together and for releasing the band ends.

The accompanying drawing illustrates the present preferred embodiment of apparatus for practicing the method of the invention, in which.

Figure 1:
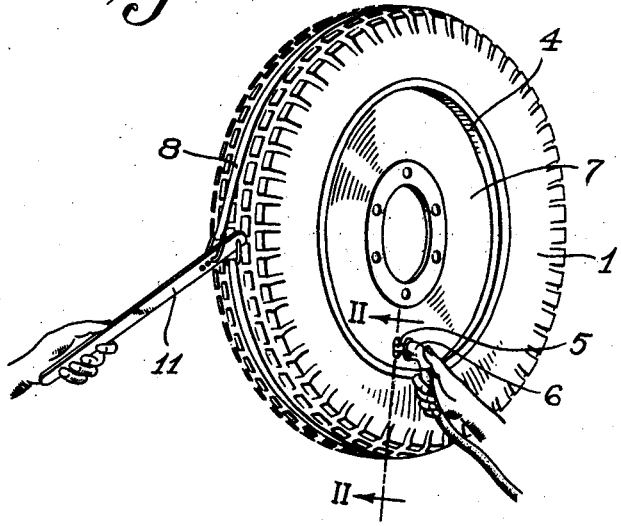
Fig. 1 is a perspective view of a tire with the tightening device in operative position.
Figure 2:
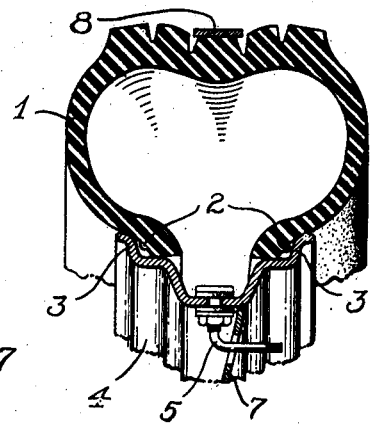
Fig. 2 is a transverse sectional view of the tire and rim, taken along the section lines II—II of Fig. 1.
Figure 3:
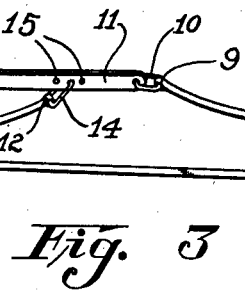
Fig. 3 is a side elevational view of one form of the apparatus.

Referring particularly to Figs. 1, 2 and 3, a vehicle tire 1, illustrated as an automobile tire, is provided with sealing devices 2 illustrated in the form of rubber gaskets disposed externally of the bead portions of the tire, and which co-operate with flanges 3 of a rim 4, illustrated in the form of a drop center rim, for completing a fluid tight seal between the tire and rim without the use of a conventional inner tube. The rim 4 carries a valve stem 5 for co-operation with an air chuck 6. The rim 4 may be mounted on a spoked wheel, either wooden or wire spokes, or on a disc wheel, as desired. In Fig. 1 a disc wheel 7 is illustrated.

In order to provide for the initial engagement of the gaskets 2 with the flanges 3 during the initial stages of tire inflation, I dispose a band 8 around the circumference of the tread portion of the tire after it has been loosely mounted in the rim 4. The band 8 is illustrated as a flat, flexible, metallic band, although it is to be understood that various forms of wire or other flexible material may be used in lieu of the metal band. An end 9 of the band 8 is connected by a link 10 with one end of a lever 11. The other end 12 of the band is connected by a link 14 with one of a number of openings 15 in the body of the lever 11.

By providing a number of openings 15 it is possible to adjust the effective circumference of the band for different sizes of tires. As the links 10 and 14 are connected at different points along the lever 11, a turning movement of the lever 11 about the link 10 bearing against the outer face of the tire causes the band 8 to be drawn against the tread of the tire with considerable force. The force applied is sufficient to spread the sidewalls and bead portions of the tire to insure the engagement of the gaskets 2 and/or the surfaces of the tire with the flanges 3 to complete the initial seal.

As soon as the initial seal is completed, fluid under pressure is admitted through the valve 5 from the chuck 6 for inflating the tire. As soon as sufficient fluid is admitted to the tire to insure retention of the gaskets 2 against the flanges 3, pressure is relieved from the lever 11 to permit the tread portions of the tire to expand. As previously stated, the expanding force of the tire is considerable, so that provision must be made for releasing the band 8 as soon as an appreciable air pressure is built up within the tire.

While I have illustrated the present invention in connection with automobile tires and drop center rims, it is to be understood that certain features of the invention are applicable to other tire and rim constructions.

Figure 4:
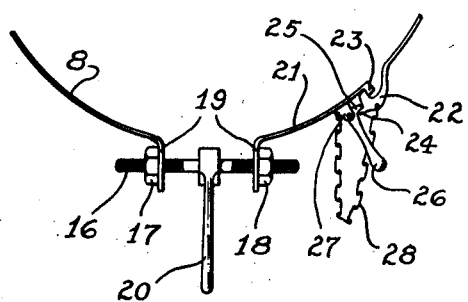
Fig. 4 is a fragmentary detailed view of another form of the apparatus.

Referring to Fig. 4, the ends of the band 8 may be drawn together by apparatus other than the lever 11, such as a double threaded screw 16 threaded into nuts 17 and 18 attached to lugs 19 secured to the ends of the band 8. A ratchet mechanism 20 provides hand operating means for rotating the screw 16 to draw the ends of the band 8 together.

In order to obtain a quick release of the band 8 it is preferable to divide the band 8 so as to form a band segment 21. At this junction, band 8 terminates with a hooked member 22 adapted to engage with a lug 23 projecting from the band segment 21 in such manner so that the band 8 and segment 21 form a circumferentially inextensible member. A lug 24 extending from the hooked member 22 co-operates with a lever 25 forming part of a handle 26 pivotally attached to a block 27 projecting from the band segment 21. Through this mechanism, an operator by moving the handle 26 causes an outward movement of the hooked member 22 from the lug 23, thus providing a quick release between the band 8 and the segment 21. A length of chain 28, or other suitable means, attached to the hooked member 22 and the lug 27, limits the circumferential movement of the respective band members.

Figure 5:
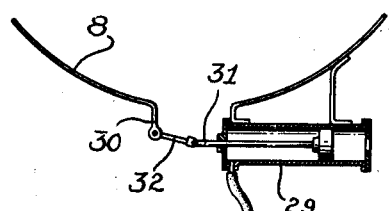
Fig. 5 is a similar view of a further form of apparatus.

Referring to Fig. 5, substantially the same results can be obtained by attaching a cylinder 29 to one end of the band 8 and a lug 30 to the other end. A piston rod 31 extending from the cylinder 29 is connected by a flexible linkage 32 to the lug 31. Upon the admission or release of fluid to or from the cylinder 29, the band 8 is expanded or contracted. In operating this form of the invention a controlled amount of fluid under predetermined pressure may be admitted to the cylinder 29 for tensioning the band 8. Thereafter as the tire is inflated the tension of the band 8 is sufficient to pull the piston rod 31 outwardly against the initial volume of fluid. The degree of inflation of the entrapped fluid is within the limits of the tensile strength of the band 8 so that danger of bursting the band is eliminated.

In all of the forms of the apparatus shown and described the initial pressure exerted by the band 8 on the tire causes the sidewalls and bead portions of the tire to be moved outwardly into engagement with the flanges 3 of the rim. The flanges engage the sidewalls of the tire and/or gaskets 2 to form an initial seal for holding the fluid first admitted to the tire until the fluid pressure within the tire is sufficient to insure the stability of the seals between the flanges 3 and the gaskets 2.

While I have shown and described certain present preferred embodiments of apparatus for mounting tires, it is to be understood that the invention may be otherwise practiced within the scope of the appended claims.

Having thus described my invention, what I claim and desire to protect by Letters Patent is:

1. In the method of mounting a tubeless tire on a continuous supporting rim, the steps comprising initially compressing the tire against the rim to cause the formation of preliminary seals between the tire and rim, then inflating the tire while the initial seals are maintained, and releasing the tire from the compressive forces and relying upon the internal pressure of the tire for maintaining the seals.

2. In the method of mounting a tubeless tire on a rim, the step comprising initially compressing a tire to cause its sidewalls and bead portions to spread outwardly for engaging the flange portions of the rim to create an initial seal.

3. In the method of mounting a tubeless tire on a rim, the step comprising initially causing the spreading of the sidewalls and bead portions of the tire to engage the rim for forming an initial seal by the application of external forces to the tire.

4. In the method of mounting a tubeless tire on a rim, the steps comprising initially causing the spreading of the sidewalls and bead portions of the tire to engage the rim for forming an initial seal by the application of external force to the tire, at least partially inflating the tire, and releasing the external force after the internal pressure in the tire is sufficient to maintain a seal.

ARTHUR W. BULL.